United States Patent [19]

Matsuo et al.

[11] 4,432,851
[45] Feb. 21, 1984

[54] ELECTRODEPOSITION OF LUBRICATIVE COATING

[75] Inventors: Sachio Matsuo, Takatsuki; Tadashi Sakane, Amagasaki; Ryoichi Noumi, Minoo; Shinji Fujiwara; Hiroshi Fukudome, both of Ibaraki; Rikizo Kobashi, Tokyo; Hiroumi Izaiku, Nishinomiya; Toshinari Yazawa, Yokohama, all of Japan

[73] Assignees: Sumitomo Metal Industries, Ltd., Osaka; Nippon Oil & Fats Co., Ltd., Tokyo, both of Japan

[21] Appl. No.: 440,525

[22] Filed: Nov. 10, 1982

[51] Int. Cl.³ .............................................. C25D 13/06
[52] U.S. Cl. .................................................. 204/181 R
[58] Field of Search ................................... 204/181 R

[56] References Cited

U.S. PATENT DOCUMENTS

| | | | |
|---|---|---|---|
| 3,585,120 | 6/1971 | Wehrmann et al. | 204/181 R |
| 3,585,172 | 6/1971 | Nishiyama et al. | 204/181 R |
| 3,591,478 | 7/1971 | Erickson | 204/181 R |
| 3,619,399 | 11/1971 | Blank et al. | 204/181 R |
| 3,671,476 | 6/1972 | Terai et al. | 204/181 R |
| 3,674,734 | 7/1972 | Parker | 204/181 R |
| 3,741,923 | 6/1973 | Fritsche et al. | 204/181 R |
| 3,902,981 | 9/1975 | Chu | 204/181 R |

FOREIGN PATENT DOCUMENTS 1250459 10/1971 United Kingdom ............ 204/181 R

Primary Examiner—R. L. Andrews
Assistant Examiner—Terryence Chapman
Attorney, Agent, or Firm—Burns, Doane, Swecker & Mathis

[57] ABSTRACT

A method of applying electrodeposition coating onto metallic material by continuously passing the metallic material through an electrodeposition bath comprising an alkaline-solution soluble resin, solid lubricant and water is disclosed.

6 Claims, 2 Drawing Figures

ELECTRODEPOSITION OF LUBRICATIVE COATING

BACKGROUND OF THE INVENTION

This invention relates to a method of providing metallic material with an electrodeposited coating for use in working, such as pressing, stamping etc.

It is the recent trend that metallic material, particularly steel sheet to be worked through pressing, stamping and so on is coated with a lubricative coating by means of dip coating, etc., prior to being subjected to working. Such coating serves to lubricate the metal surface while it is subjected to forming. Such coating is also effective to keep metallic material, particularly metal sheets in a stack from slipping and falling down. Many processes for preparing such coating, therefore, have been proposed and are in development.

For use in working metallic materials, lubricants such as mineral oils, animal oils, vegetable oils and synthetic lubricants (e.g., synthetic esters) with or without an oiliness improver, an extreme pressure additive, etc. have been known in the art. However, they all have a disadvantage in that galling or scoring of the pressed articles is inevitable during working.

Soda soap and water soluble soap which comprises sodium borate or the like as its major component are also used as a lubricant. However, it is sometimes difficult to cover the newly developed metal surface completely with them during working, and incomplete covering leads to pressing flaws. Thus, a metal blank with such lubricant has less formability.

Japanese Patent Publication No. 22948/1977 discloses a lubricant comprised of a mixture of a resin component with wax or fatty esters, etc. It is rather difficult to apply this type of lubricant in a thin and uniform layer. However, if applied in a thick layer, the lubricant easily adheres to the surface of the die or punch and forms deposits thereon.

Japanese Patent Publication No. 29819/1980 discloses a dual-layer lubricative coating in which a liquid lubricant (fats and oils, for example) or a solid lubricant (graphite, for example) is applied over an organic resin film which has been previously placed on the metal substrate. However, this dual-layer coating type lubricant is expensive, since it is necessary to carry out hot-air drying and then bake-hardening at a temperature of 100° C. or higher after the application thereof. In addition, a coating of fats and oils develops an unpleasant odor and the coated surface becomes sticky and rough.

Many methods for application of coating are known to those skilled in the art, including brushing, roll coating, dip coating, spray coating, curtain flow coating and so on. All these prior art processes, however, have a common disadvantage in that it is quite difficult to control application of the lubricant precisely so as to make the coating thin and uniform.

Usually, therefore, it is preferable to employ an electrodeposition coating process for such purpose. According to the electrodeposition coating process, a shearing stress is applied to the surface of the metal being treated, since the speed at which the steel sheet travels through the electrodeposition bath is very high. In addition, when the composition of the coating is comprised of a mixture of two or more components such as a resin and a lubricant which have different electrophoresis properties, it is sometimes difficult to obtain a coating having the intended properties, because the composition (i.e., resin-to-lubricant ratio) of the resulting coating differs much from that of the electrodeposition bath. This difference in composition between the electrodeposition bath and the coating becomes greater when such strong shearing stress as mentioned above is applied to the surface of the metal.

OBJECT OF THE INVENTION

An object of this invention is to provide a method of providing a metallic material with an electrodeposition coating free from scoring and pressing flaws during working.

Another object of this invention is to provide an easier but practical method of providing a metallic material with electrodeposition coating, which can be handled quite easily.

Still another object of this invention is to provide a method of providing a metallic material with a thin and uniform coating having a predetermined composition.

SUMMARY OF THE INVENTION

The inventors of this invention found that in the cases where electrodeposition coating is continuously applied onto metallic material in an electrodeposition bath comprising an alkaline-solution soluble resin, a solid lubricant and water to provide coating with intended properties, there is a close relationship among the concentration of the solid lubricant in the solids of the bath, the electrodeposition treating time and the travelling speed of the metallic material through the bath.

The inventors of this invention also found that in order to prevent scoring or the formation of pressing flaws during pressing, stamping, etc, it is desirable to employ an electrodeposition bath containing two specific components in amounts each within certain ranges.

Thus, in its broad aspect, this invention resides in a method of applying electrodeposition coating onto metallic material by continuously passing the metallic material through an electrodeposition bath comprising an alkaline-solution soluble resin, a solid lubricant and water, characterized in that the bath temperature is not lower than 35° C., the bath voltage applied is not lower than 60 V and the electrodeposition is carried out under the conditions defined by the following equation:

$$aB + bT - cS \geq 3 \quad (1)$$

($a=0.40$–$0.70$, $b=0.50$–$1.00$ and $c=0.010$–$0.020$) wherein, "B" stands for the weight percent of the solid lubricant based on the solids content of said electrodeposition bath;

"T" stands for the electrodeposition treating time in seconds; and

"S" stands for the travelling speed in meters per minute (m/min) of the metallic material through the electrodeposition bath.

The term "speed" used herein means the travelling speed of the metallic material relative to the electrodeposition bath which may flow countercurrently.

In a preferred embodiment, the solids of the electrodeposition bath used in this invention desirably consist essentially of the following alkaline-solution soluble resin and solid lubricant;

(A) Alkaline-solution soluble resin:

The alkaline-solution soluble resin is a salt, preferably amine salt or ammonium salt, of a copolymer having a glass transition temperature of from $-10°$ C. to 35° C.

and a number-average molecular weight of 5,000 to 50,000, the copolymer comprising 5–30% by weight of acrylic acid, methacrylic acid or a mixture thereof and 70–95% by weight of an acrylate or methacrylate ester of a monovalent aliphathic alcohol ($C_1$–$C_8$) or a mixture thereof. The alkaline-solution soluble resin comprises 40–95% by weight of the solids content of the bath.
(B) Solid lubricant:
The solid lubricant comprises 5–60% by weight of the solids content and is water-dispersible organic metal soap having a particle size of 0.1 to 10$\mu$.

DETAILED DESCRIPTION OF PREFERRED EMBODIMENTS

Figure 1:
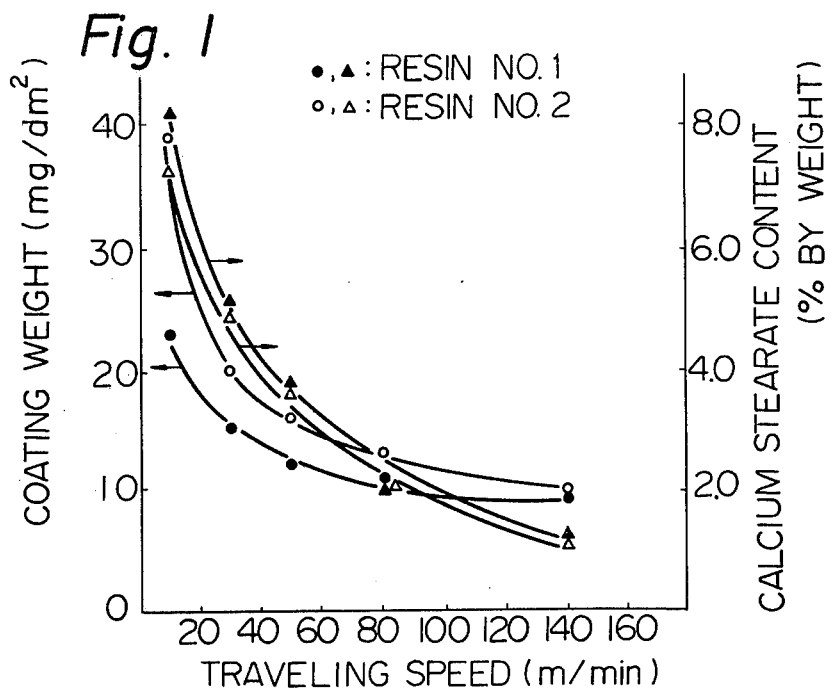
FIG. 1 shows a graph obtained by plotting experimental data of coating weight and its calcium strearate content with respect to the indicated travelling speed of the metallic sheet.

Important properties to be considered on the coated metallic material prepared in accordance with this invention include the resistance to scoring or galling and drawability. The scoring or galling of the metal surface of the pressed articles is caused by metal-to-metal contact which is sometimes found during pressing. In order to prevent such contact, a resin layer should be placed between metal surfaces. However, if the softening point of the resin is low, the resin layer easily tears down during pressing to give metal-to-metal contact which causes the scoring or galling. Furthermore, when the metal sheets are stacked, the metal surfaces easily adhere to each other. If the adhesion between the coating and the metal surface is not good, the coating sometimes peels off upon working. The fragments of the thus peeled-off coating deposit on the surface of die, punch and the like, causing the formation of pressing flaws during working.

In order to improve drawability, it is preferable to employ a resin having a lower softening point. However, on the other hand, as mentioned above, a resin having a low softening point has many disadvantages for the purposes of this invention. It is therefore, impractical to select a resin having a softening point which is low enough to improve drawability of a metal sheet to be electrodeposited in accordance with this invention. Thus, according to this invention, metal soap is incorporated in the coating applied to the metal surface to improve drawability. In general, it is necessary to incorporate the metal soap in the electrodeposited coating in an amount of at least 2% by weight, preferably from 3% to 5% by weight.

As previously mentioned, electrodeposition coating is the most suitable method to achieve continuous application of a uniform and thin coating onto the surface of a metal substrate at a high speed. However, when the coating is comprised of two components, i.e., a resin and a metal soap, it is often experienced that the ratio of resin to metal soap of the coating significantly differs from that of the electrodeposition bath. For example, if the ratio of resin to soap is adjusted to 97/3 in the bath, the resulting coating contains metal soap in an amount of far less than 3% by weight, particularly in the case of high speed electrodeposition. Therefore, to ensure getting the predetermined amount of metal soap in the resulting coating, it is necessary to add the metal soap to the bath in an amount much larger than the desired amount set for the coating.

The electrodeposition bath of this invention comprises an alkaline-solution soluble resin, a solid lubricant and water. The bath temperature is 35° C. or higher. When it is lower than 35° C., metal soap as solid lubricant does not adhere to the metal surface uniformly, sometimes resulting in indentation flaws during working.

The bath voltage, i.e. the voltage applied during operation is desirably 60 V or higher, preferably 80 V or higher. When the voltage is lower than 60 V, the electrodeposition efficiency is lowered and it is impossible to obtain a coating of the necessary weight through a short high-speed treatment according to this invention.

Furthermore, according to this invention the metallic material is treated under the conditions defined by the following equation:

$$aB + bT - cS \geq 3$$

($a$=0.40–0.70, $b$=0.50–1.00 and $c$=0.010–0.020) wherein, "B" stands for the weight percent of the solid lubricant based on the solids content of the electrodeposition bath, "T" stands for the electrodeposition treating time in seconds, and "S" stands for the travelling speed in meters per minute (m/min) of the metallic material through the electrodeposition bath. The factors, a, b, c, are determined taking into consideration the bath temperature, bath voltage and so on at which the electrodeposition of this invention is carried out. The above equation has been derived on the basis of the recognition that the concentration of lubricant has an influence, as mentioned above, on the drawability of the resulting metallic material and that the treating time as well as the travelling speed of metallic material should also be taken into consideration in order to determine the conditions under which the given amount of lubricant may be incorporated in the resulting electrodeposition coating. Further explanation in this respect will be found hereinafter.

The alkaline-solution soluble resin to be employed in in this invention is preferably derived from (I) 5–30% by weight of acrylic acid or methacrylic acid or a mixture thereof and (II) 70–95% by weight of an acrylate or methacrylate ester of a monovalent $C_1$–$C_8$ aliphatic alcohol or a mixture thereof. Examples of the ester include methyl acrylate (MA), ethyl acrylate (EA), n-butyl acrylate (BA), isobutyl acrylate (IBA), 2-ethylhexyl acrylate (EHA), methyl methacrylate (MMA), ethyl methacrylate (EMA), n-butyl methacrylate (BMA), isobutyl methacrylate (IBMA), 2-ethylhexyl methacrylate (EHMA), and the like. Other monomers such as acrylate or methacrylate esters of higher alcohols (e.g., stearyl acrylate and methacrylate) and hydroxyalkyl acrylate or methacrylate (e.g., hydroxyethyl or hydroxypropyl methacrylate) may be incorporated in the resin in minor amounts in order to modify the properties of the resin.

When the acid monomer (I) is less than 5% by weight, the water dispersibility of the resulting resin is low and it is rather difficult to remove the coating by subsequent alkali degreasing and cleaning. Furthermore, the coating cannot be applied uniformly onto the metal surface. On the other hand, when the acid monomer (I) is present in an amount of more than 30% by weight, the number of carboxyl groups in the resin increases so much that it takes a long time to finish film formation. This is not desirable from a practical viewpoint.

The glass transition temperature of the resulting resin which is a copolymer of monomers (I) and (II) is preferably from $-10°$ C. to $35°$ C., more preferably from $10°$ C. to $35°$ C. When the glass transition temperature is lower than $-10°$ C., metal-to-metal contact easily occurs during working, resulting in galling. On the other hand, when the glass transition temperature is higher than $35°$ C., friction between the metal die and the coating becomes great, frequently resulting in peeling of the coating. The number average molecular weight of the resin is preferably in the range of from 5,000 to 50,000. When the molecular weight is less than 5,000, the coating has a strong tendency to adhere to the die surface. This has been confirmed by the results of die-scoring test. When the molecular weight is more than 50,000, the resulting resin has poor solubility in water which is not enough to ensure that uniform coating is formed. In addition, such resin may not be thoroughly removed by degreasing and cleaning after pressing.

The resin to be used in this invention which is soluble in an alkaline solution and which may be either water soluble or water dispersible, may be prepared by any one of the usual polymerization methods, such as solution polymerization, emulsion polymerization, etc. When the solution polymerization is employed to prepare the resin, said monomers (I) and (II) in a hydrophilic solvent are kept at a temperature of $50°-150°$ C. for 2–8 hours in the presence of an initiator. The aqueous solution or dispersion of the resin thus formed is then neutralized with a saturated short chain alkyl amine or aqueous ammonia to pH 6–9 in a conventional manner to form a salt of the resin prior to use. In general the solution or dispersion for use in preparing an electrodeposition bath contains the resin at a concentration of from 20% to 50% by weight.

The hydrophilic solvent useful as a polymerization medium includes $C_1$–$C_4$ alcohols, preferably isopropyl alcohol. The initiator may be conventional one such as benzoyl peroxide or 2,2'-azobisisobutyronitrile. Examples of the amine used in neutralization include monoethylamine, diethylamine, triethylamine, tributylamine, monoethanolamine, diethanolamine, triethanolamine and the like.

When emulsion polymerization is employed, a small amount of a surfactant may be added. However, when the surfactant is used in excess, then the film forming properties of the resin and adhesion of the electrodeposited coating to the metal surface are sometimes impaired, so care should be taken to ensure that the surfactant is not added in excess.

The metal soaps which can be used in this invention include alkaline earth metal salts such as calcium, barium and magnesium salts of a $C_{12}$–$C_{22}$ higher fatty acid such as lauric acid, palmitic acid, stearic acid, behenic acid or the like. The appropriate particle size of the metal soap mainly depends on the thickness of coating desired and it is usually in the range of from 0.1 to $10\mu$, preferably from 3 to $7\mu$. When the particle size is less than $0.1\mu$, a stable dispersion may not be obtained. On the other hand, when the particle size is more than $10\mu$, a rough surface is obtained resulting in dents when drawing. Furthermore, a particle size of more than $10\mu$ adversely affects the subsequent alkali cleaning step conducted after working, resulting in incomplete removal of the coating. The metal soap is added in an amount of 5–60% by weight based on the total solids content of the electrodeposition bath. Of course, the amount of the metal soap should be selected so as to satisfy the foregoing equation (1) as previously described.

After electrodeposition, if necessary, the metallic material is washed with water and dried.

The metallic material to be treated in accordance with this invention includes not only sheets, strips and plates, but also wires and the like.

As is apparent from the foregoing, this invention is based on a close relation found among such parameters as treating time, travelling speed of the metallic material and concentration of the solid lubricant (metal soap). More particularly this invention is characterized by suitably selecting the amount of the solid lubricant to be incorporated in the electrodeposition bath in correlation with the travelling speed and the treating time so as to satisfy the equation (1) mentioned hereinbefore. These conditions ensure that a desired amount of the solid lubricant is incorporated in the resulting electrodeposited coating.

This invention will be described in conjunction with the working examples, which are presented merely for illustration and are not as restrictive of this invention at all. In the examples all the parts and percentages are by weight unless otherwise indicated.

EXAMPLE 1

Aqueous solutions of various water-soluble resins were prepared in the following manner.

The monomers used were acrylic acid (AA), methyl acrylate (MA), stearyl acrylate (SA), 2-ethylhexyl acrylate (EHA), butyl methacrylate (BMA), isobutyl methacrylate (IBMA), 2-ethylhexyl methacrylate (EHMA), stearyl methacrylate (SMA), hydroxyethyl methacrylate (HEMA), hydroxypropyl methacrylate (HPMA) and methyl methacrylate (MMA) and they were used in the proportions indicated in Table 1 below.

The aqueous solution of Resin No. 1, for example, was prepared by reacting a mixture of 210 parts of methyl acrylate, 60 parts of methyl methacrylate and 30 parts of acrylic acid in 75 parts of isopropyl alcohol for about 4 hours under reflux of the alcohol solvent in the presence of 2.7 parts of 2,2'-azobisisobutyronitrile as a catalyst. The isopropyl alcohol was then distilled off in vacuo and the residue was neutralized with 21 parts of diethylamine and 661 parts of water to give an aqueous resin solution of about 30% solids content.

The aqueous solutions of Resin Nos. 2 through 16 were likewise prepared. The amount of diethylamine used for neutralization, however, was varied depending on the acrylic acid content of the solution.

The glass transition temperature and the number average molecular weight of each resin obtained are also included in Table 1.

To 100 parts of each aqueous resin solution thus obtained was added 300 parts of water to provide an electrodeposition bath of about 10% solids content, which was subjected to an electrodeposition test.

In the electrodeposition test a cold rolled steel sheet 0.8 mm thick was degreased and subjected to electrodeposition using the sheet as an anode. The electrodeposition was carried out in a stream of the bath flowing at high velocity to simulate continuous electrodeposition coating. The following conditions were employed in the electrodeposition: distance between electrodes, 100 mm; anode-to-cathode ratio, 1/1; temperature, $35°$ C.;

travelling speed of the sheet, 1 m/min. Electric current was passed for 10 seconds with applied (bath) voltage of 40–80 V. The travelling speed of the steel sheet relative to the bath was 10 m/min. The electrodeposited steel sheet was then rinsed with water and dried prior to weighing. The weights of the coatings obtained at various applied voltages are summarized in Table 2 below, from which it can be seen that the higher the applied voltage, the heavier the coating weight and that an adequate coating weight cannot be obtained unless the applied voltage is 60 V or higher.

Next, a similar electrodeposition test was carried out under the same conditions as above except that electric current was passed for 1, 2 or 3 seconds with applied voltage of 80 V. The results are summarized in Table 3 below, from which it can be seen that in order to obtain an increased coating weight the electrodeposition should be conducted for a prolonged period of time.

TABLE 3-continued

| Resin No. | Coating Weight (mg/dm$^2$) Treating Time | | |
|---|---|---|---|
| | 1 second | 2 seconds | 3 seconds |
| 7 | <1 | <1 | <1 |
| 8 | <1 | <1 | <1 |
| 9 | <1 | <1 | <1 |
| 10 | <1 | 1(0.1) | 8(0.6) |
| 11 | 3(0.2) | 8(0.6) | 11(0.8) |
| 12 | <1 | <1 | <1 |
| 13 | <1 | <1 | <1 |
| 14 | <1 | <1 | <1 |
| 15 | 12(0.9) | 32(2.4) | 55(4.1) |
| 16 | <1 | <1 | <1 |

Note: The numbers in parentheses designate thickness of the coating ($\mu$).

Resin Nos. 1, 2, 3, 4, 5, 11 and 15 prepared above, which were found to have particularly good initial film

TABLE 1

| | Resin No. | Monomer (% by weight) | | | | | | | | | | | Glass transition temperature T$_g$ (°C.) | Number average molecular weight |
|---|---|---|---|---|---|---|---|---|---|---|---|---|---|---|
| | | AA | MA | SA | EHA | BMA | IBMA | EHMA | SMA | HEMA | HPMA | MMA | | |
| This Invention | 1 | 10 | 70 | | | | | | | | | 20 | 31.5 | 5500 |
| | 2 | 10 | 60 | | | | | | 10 | | | 20 | 12.2 | 8300 |
| | 3 | 10 | 50 | | | | | | 20 | | | 20 | −4.7 | 12900 |
| | 4 | 30 | | | 60 | | | | 10 | | | | 19.6 | 10100 |
| | 5 | 20 | | | | | | 70 | | 10 | | | 13.2 | 11600 |
| | 6 | 20 | | | | | | 60 | | 20 | | | 19.5 | 10700 |
| | 7 | 20 | | | | | | 40 | | 40 | | | 33.0 | 17700 |
| | 8 | 20 | | | | | | 70 | | | 10 | | 11.7 | 13100 |
| | 9 | 20 | | | | | | 60 | | | 20 | | 16.3 | 14200 |
| | 10 | 20 | | | | | | 40 | | | 40 | | 26.1 | 12600 |
| Comparative | 11 | 10 | 40 | | | | | | 30 | | | 20 | −19.8 | 15800 |
| | 12 | 10 | 40 | 30 | | | | | | | | 20 | 40.5 | 10400 |
| | 13 | 10 | 60 | | | | 10 | | | | | 20 | 35.7 | 13300 |
| | 14 | 10 | 50 | | | | 20 | | | | | 20 | 40.0 | 14500 |
| | 15 | 10 | 40 | | | 30 | | | | | | 20 | 44.4 | 17700 |
| | 16 | 10 | | | 15 | 55 | | | | | | 20 | 38.7 | 18200 |

TABLE 2

| Resin No. | Coating Weight (mg/dm$^2$) Bath Voltage | | |
|---|---|---|---|
| | 40 V | 60 V | 80 V |
| 1 | 12 | 30 | 36 |
| 2 | 9 | 20 | 25 |
| 3 | 7 | 20 | 29 |
| 4 | 10 | 25 | 33 |
| 5 | 6 | 20 | 20 |
| 6 | 4 | 15 | 26 |
| 7 | 3 | 16 | 23 |
| 8 | 2 | 10 | 18 |
| 9 | 4 | 15 | 24 |
| 10 | 6 | 32 | 41 |
| 11 | 8 | 21 | 28 |
| 12 | 2 | 8 | 13 |
| 13 | 3 | 15 | 24 |
| 14 | 2 | 12 | 18 |
| 15 | 10 | 45 | 68 |
| 16 | <1 | <1 | <1 |

TABLE 3

| Resin No. | Coating Weight (mg/dm$^2$) Treating Time | | |
|---|---|---|---|
| | 1 second | 2 seconds | 3 seconds |
| 1 | 16(1.2) | 16(1.2) | 18(1.4) |
| 2 | 3(0.2) | 8(0.6) | 9(0.7) |
| 3 | 2(0.2) | 9(0.7) | 11(0.8) |
| 4 | 5(0.4) | 8(0.6) | 11(0.8) |
| 5 | 9(0.7) | 9(0.7) | 9(0.7) |
| 6 | <1 | <1 | <1 | forming properties, were used to provide a lubricative coating through electrodeposition using an electrodeposition bath containing the resin as an alkaline-solution soluble resin and calcium stearate as a solid lubricant.

The electrodeposition bath was prepared as follows. In a grain mill 75 parts of calcium stearate (particle diameter, 2–25$\mu$) were dispersed in 500 parts of the aqueous resin solution of about 30% solids content obtained above for 5 hours and 77 parts of the resulting calcium stearate-containing dispersion were mixed with 233 parts of the same aqueous resin solution as used above and 690 parts of water to give 1000 parts of a dispersion of 10% solids content containing 1% calcium stearate having a particle diameter of 0.1–10$\mu$. From the aqueous solution each of Resin Nos. 1, 2, 3, 4, 5, 11 and 15, a dispersion of 10% solids content was prepared in the manner mentioned above and used as an electrodeposition bath.

The electrodeposition was carried out in the same way as described hereinbefore under the following conditions: distance between electrodes, 100 mm; anode-to-cathode ratio, 1/1; bath voltage of 80 V; and steel sheet travelling speed relative to the electrodeposition bath, 10 m/min. The actual travelling speed of the steel sheet itself was 1 m/min. Electric current was passed for 2 seconds, that is, the electrodeposition was continued for 2 seconds. The electrodeposited test piece thus obtained was subjected to various performance tests. The test results are shown in Table 4 given below.

TABLE 4

| | | Die Flawing Resistance | | | | |
|---|---|---|---|---|---|---|
| | Resin No. | Galling | Adhesiveness | Cylindrical drawability | Stacking properties | Degreasing properties |
| This Invention | 1 | O | O | O | O | O |
| | 2 | O | O | O | O | O |
| | 3 | O | O | O | O | O |
| | 4 | O | O | Δ | O | O |
| | 5 | O | O | O | O | O |
| Comparative | 11 | X | Δ | O | X | O |
| | 15 | O | X | Δ | O | O |

As is apparent from the test results shown in Table 4, coatings which were obtained by using Resin Nos. 1, 2, 3, 4 and 5 in accordance with this invention have satisfactory properties: die resistance, cylindrical drawing properties, stacking properties and degreasing properties.

The testing and evaluation methods which were employed to obtain these experimental data are outlined below.

(i) Test for resistance to die flawing:

Ironing was carried out at a high working rate with a crank press in order to determine galling of the metal surface. Galling during ironing was determined by measuring the area of the vertical wall portion free from galling on the tenth of ten test blanks which were worked under the same conditions. The symbol "O" indicates that over 90% of the vertical wall area of the test piece was free from galling. The symbol "Δ" indicates that 80–90% of the area was free from galling. The symbol "X" indicates that less than 80% of the area was free from galling.

In addition, the amount of coating remaining after ironing was visually determined in the following manner. The vertical wall area of the test piece was covered with a grid pattern comprising 50 squares (5 mm×5 mm). Then the number of squares where the coating remaining after ironing out of the total 50 squares was counted. The symbols indicate the proportion of coating remaining on the metal surface of the inspected area as follows: "O", more than 80%; "Δ", 70–80%; "X", less than 70%.

(ii) Test for cylindrical drawability:

Punching was carried out at a retaining pressure of 1000 kg/cm² using a punch 33.0 mm in diameter to determine the maximum blank diameter which can be drawn without breaking the blank. The limiting drawing ratio can be given by the following equation:

Limiting Drawing Ratio (LDR) =

$$\frac{\text{Maximum blank diameter which can be drawn successfully}}{\text{Punch diameter}}$$

The limiting drawing ratio was determined for a coated metal blank ($LDR_c$) and for a noncoated metal blank ($LDR_n$). The cylindrical drawability is indicated in terms of the ratio of $LDR_c$ to $LDR_n$ shown by the following symbols: "X", not more than 1.0; "Δ", 1.0–1.1; "O", over 1.1.

(iii) Test for stacking properties:

Two 50×50 mm test pieces having surfaces coated in accordance with this invention were placed together with the coated surfaces being kept in face-to-face contact. A plurality of such sets of two pieces were kept at a temperature of 50° C. under pressure of 67 kg/cm² for 1 minute and then at 40° C. at 500 g/m² for 16 hours. After that the test pieces were subjected to aging at room temperature at 500 g/m² for 50 days. In this example, stacking properties are indicated in terms of adhesiveness of the coating. The degree of difficulty required to separate is indicated by the following symbols: "O", no difficulty; "Δ", some difficulty; "X", great difficulty=strong adhesion.

(iv) Degreasing test:

Coated test pieces were subjected to alkali cleaning, in which an alkali cleaning medium of a 2% solution of Fine Cleaner 4336 (tradename of Nihon Parkerizing K.K.) was sprayed against the metal surface at a pressure of 1 kg/cm² at 60°–70° C. for 5 seconds. The extent to which the cleaned surface repelled water is indicated by the following symbols: "O", no water repellence; "Δ", water was repelled to some extent; "X", the entire metal surface repelled water.

EXAMPLE 2

In this example, Resin Nos. 1 and 2 which were demonstrated to have satisfactory performance in all the properties tested in Example 1 were used to prepare dispersions each containing the resin and calcium stearate in the same manner as described in Example 1.

A series of experiments was carried out using these dispersions as an electrodeposition bath. The electrodeposition was carried out at various steel sheet travelling speed under generally the same conditions as in Example 1. Electric current was passed for 2 seconds at a bath voltage of 80 V. In this example, the travelling speed means that of the steel sheet to be treated relative to the electrodeposition bath, since the steel sheet was placed in the bath and the dispersion which served as the electrodeposition bath was circulated through the bath at the indicated speed.

The coating weight was determined and the calcium stearate content of the coating was also determined by means of fluorescent X-ray analysis. The results are summarized in graphs of FIG. 1.

Figure 2:
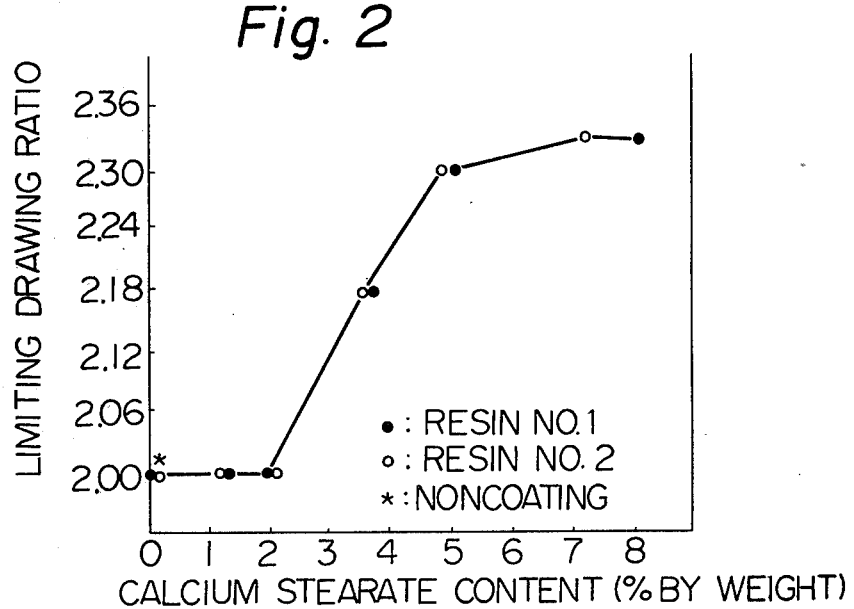
FIG. 2 is a graph showing the relationship between the limiting drawing ratio and the calcium stearate content of the coating.

The drawability of the thus obtained coated metal sheet is shown in FIG. 2. As is apparent from the data shwon therein, when the calcium stearate content of the coating exceeds 3%, the drawability is improved significantly. And, when the calcium stearate content exceeds 5%, the improvement in drawability is nearly saturated.

EXAMPLE 3

Another series of experiments was carried out in order to determine processing conditions which ensures that the coating applied onto the metal surface always contains 3% or more of calcium stearate. These experiments were carried out under various conditions using an electrodeposition bath containing various amounts of calcium stearate. The resulting test results were analyzed by means of multiple regression analysis, and the following equation was derived from these data showing that the desired coating can be obtained successfully as long as the processing conditions follow the relation:

$$aB + bT - cS \geq 3$$

($a = 0.40$–$0.70$, $b = 0.50$–$1.0$ and $c = 0.010$–$0.020$)

The meanings of "B", "T" and "S" are as defined hereinbefore.

The concentration of the solid lubricant in the electrodeposition bath is in the range of 5–60% by weight based on the solids content of the bath, and the travelling speed at which the metallic material passes through the electrodeposition bath is generally in the range of 10–140 m/min.

The factors, a, b, c, in the above equation may be determined depending on other processing conditions including bath temperature, bath voltage and so on. Usually, they take:

a=0.55, b=0.75 and c=0.015.

The following are two typical examples of the experimental data obtained in this example:

| Electrodeposition conditions | Case - I | Case - II |
|---|---|---|
| Travelling Speed of Steel Sheet | 30 m/min | 120 m/min |
| Calcium Stearate Concentration of Bath (Based on Total Solids) | 6% | 10% |
| Treating Time | 4 sec | 1 sec |
| Coating Weight | 17 mg/dm$^2$ | 19 mg/dm$^2$ |
| Calcium Stearate Content of Coating | 4.2% | 4.9% |

What is claimed is:

1. A method of applying electrodeposition coating onto metallic material by continuously passing the metallic material through an electrodeposition bath comprising an alkaline-solution soluble resin, a solid lubricant and water, characterized in that the bath temperature is not lower than 35° C., the bath voltage applied is not lower than 60 V and the electrodeposition is carried out under the conditions defined by the following equation:

$$aB + bT - cS \geq 3$$

(a=0.40–0.70, b=0.50–1.00 and c=0.010–0.020)
where "B" stands for the weight percent of the solid lubricant based on the solids content of said electrodeposition bath;
"T" stands for the electrodeposition treating time in seconds; and
"S" stands for the traveling speed in meters per minute (m/min) of the metallic material through the electrodeposition bath,
wherein said alkaline-solution soluble resin comprises 40–95% by weight of the solids content of the bath and is a salt of a copolymer having a glass transition temperature of −10° C. to 35° C. and a number-average molecular weight of 5,000–50,000, said copolymer comprising 5–30% by weight of acrylic acid, methacrylic acid or a mixture thereof and 70–95% by weight of an acrylate or methacrylate ester of a monovalent aliphatic $C_1$–$C_8$ alcohol or a mixture thereof, and said solid lubricant comprises 5–60% by weight of the solids content of the bath and is a water-dispersible organic metal soap having a particle size of from 0.1 to 10μ.

2. A method as defined in claim 1 in which said salt of copolymer is an amine or ammonium salt.

3. A method as defined in claim 1 in which the electrodeposition is carried out at a bath voltage of 80 V or higher and at a metallic material travelling speed of 10–140 m/min.

4. A method as defined in claim 1 in which the electrodeposition is carried out under such conditions that a lubricative coating containing at least 3% by weight of the solid lubricant may be obtained.

5. A method of applying electrodeposition coating onto cold rolled steel sheet by continuously passing the sheet through an electrodeposition bath comprising an alkaline-solution soluble resin, a solid lubricant and water, said steel sheet serving as an anode, characterized in that the bath temperature is not lower than 35° C., the bath voltage applied is not lower than 60 V, said steel sheet travels through the bath at a speed of 10–140 m/min and the electrodeposition is carried out under the conditions defined by the following equation:

$$aB + bT - cS \geq 3$$

(a=0.40–0.70, b=0.50–1.00 and c=0.010–0.020)
where "B" stands for the weight percent of the solid lubricant based on the solids content of said electrodeposition bath;
"T" stands for the electrodeposition treating time in seconds; and
"S" stands for the travelling speed in meters per minute (m/min) of the steel sheet passing through the electrodeposition bath,
wherein said alkaline-solution soluble resin comprises 40–95% by weight of the solids content of the bath and is a salt of a copolymer having a glass transition temperature of −10° C. to 35° C. and a number-average molecular weight of 5,000–50,000, said copolymer comprising 5–30% by weight of acrylic acid, methacrylic acid or a mixture thereof and 70–95% by weight of an acrylate or methacrylate ester of a monovalent aliphatic $C_1$–$C_8$ alcohol or a mixture thereof, and said solid lubricant comprises 5–60% by weight of the solids content of the bath and is a water-dispersible organic metal soap having a particle size of from 0.1 to 10μ.

6. A method as defined in claim 5, in which the electrodeposition is carried out under such conditions that a lubricative coating containing at least 3% by weight of the solid lubricant may be obtained.

* * * * *